United States Patent Office 3,162,650
Patented Dec. 22, 1964

3,162,650
PRODUCTION OF 2,4-DICYANOTHIOPHENE
Adriaan Bantjes, Wilmington, Del., assignor, by mesne assignments, to E. I. du Pont de Nemours and Company, Wilmington, Del., a corporation of Delaware
No Drawing. Filed Sept. 27, 1961, Ser. No. 140,989
Claims priority, application Canada Dec. 2, 1960
3 Claims. (Cl. 260—329)

This invention relates to the compound 2,4-dicyanothiophene, and to a method for its preparation.

The 2,4-disubstituted thiophenes are known to be relatively inaccessible heterocyclic compounds. Complex or intricate synthetic routes have been devised for their preparation. An object of this invention, therefore, is to provide a straightforward, inexpensive method for the synthesis of 2,4-disubstituted thiophenes, particularly 2,4-dicyanothiophene. A further object of this invention is to provide a simple, synthetic route to 2,4-dicarboxythiophene and 2,4-bisaminomethylthiophene and to polymeric materials derived therefrom. Other objects will appear hereinafter.

The objects of this invention are accomplished by heating a mixture of acrylonitrile and elemental sulphur in an inert atmosphere to a temperature of at least about 160° C., separating the products obtained, and recovering 2,4-dicyanothiophene.

The preferred temperature range for carrying out the process of this invention is 160–200° C. Since this temperature exceeds the normal boiling point of acrylonitrile, a pressure above atmospheric must be employed, and this is most conveniently achieved by carrying out the reaction in an autoclave under autogeneous pressure. Before heating the reagents, the air in the autoclave should be replaced by an inert gas, such as nitrogen or argon. In order to further minimize oxidation of the materials and to suppress polymerization of the acrylonitrile under the conditions of the reaction, inhibitors of the hydroquinone type are preferably incorporated in the reaction mixture. The autoclave is then brought up to reaction temperature, and heating is continued until reaction takes place. Generally, reaction is completed within a period of from about one-half hour to about four and one-half hours.

The reaction product is a mixture containing $\beta,\beta'$-thiodipropionitrile, 2,4-dicyanothiophene, and other products. This mixture may be separated into its component parts by any convenient technique, such as fractional distillation. The 2,4-dicyanothiophene is thereby isolated. Under the conditions of the reaction, it is indeed surprising that no appreciable amount of either 2,5-dicyanothiophene or 3,4-dicyanothiophene is produced.

The following example is illustrative of the practice of this invention.

Example

Into a 300 ml. autoclave equipped with stirrer are introduced 133 ml. of acrylonitrile, 33 g. of flowers of sulphur, and 2.7 g. of hydroquinone. The air in the autoclave is replaced with nitrogen, and the contents are heated with stirring to a temperature of 160–200° C. for a period of one-half to four and one-half hours. The reaction product consists of a dark, viscous oil. On distillation of this oil under vacuum, there is obtained a 10% yield of 2,4-dicyanothiophene (boiling point 110–115° C. at 0.5–1 mm. mercury pressure). After recrystallization from ethanol, the solid 2,4-dicyanothiophene melts at 163–164° C. and contains by analysis 53.75% carbon, 1.75% hydrogen, 20.76% nitrogen and 23.72% sulphur.

Hydrolysis of the above-described 2,4-dicyanothiophene under basic conditions yields 2,4-dicarboxythiophene, melting at 316° C. and having an observed neutral equivalent of 85.4. Esterification of this dicarboxylic acid with methanol yields the dimethyl ester, which melts at 121.5–122.5° C., corresponding closely to the known melting point (123° C.) of 2,4-dicarbomethoxythiophene.

The infrared absorption spectrum of the 2,4-dicyanothiophene obtained is in agreement with the spectrum expected for a compound of that structure.

As indicated in the example hereinabove, 2,4-dicyanothiophene is conveniently converted to the corresponding acid, 2,4-dicarboxythiophene. This acid may be used alone or together with other dicarboxylic acids in making polyamides or copolyamides by conventional methods involving reaction with organic diamines, e.g., hexamethylene diamine. The dimethyl ester of 2,4-dicarboxythiophene, in admixture with dimethyl terephthalate, may be reacted with aliphatic glycols in known manner for the preparation of copolyesters. Through hydrogenation of the cyano groups, 2,4-dicyanothiophene may be converted to 2,4-bisaminomethylthiophene, and this diamine may be used as the diamine component in the synthesis of polyamides. The aforementioned polyamides and polyesters are useful in making synthetic fibers and films having varied utility in the textile and industrial fields.

The embodiments of the invention in which an exclusive property or privilege is claimed are defined as follows:

1. The method which comprises heating a mixture of acrylonitrile and elemental sulphur in an inert atmosphere to a temperature of at least about 160° C., separating the products obtained, and recovering 2,4-dicyanothiophene.

2. The method of claim 1 wherein the said temperature is in the range from about 160° C. to about 200° C.

3. The method which comprises heating a mixture containing acrylonitrile and sulphur in a ratio of 2 gram-molecular weights of acrylonitrile per gram-atomic weight of sulphur in the presence of a stabilizing amount of hydroquinone for one-half to four and one-half hours at a temperature of 160° to 200° C., separating the products by fractional distillation, and recovering 2,4-dicyanothiophene.

References Cited in the file of this patent
UNITED STATES PATENTS

| | | |
|---|---|---|
| 2,683,163 | Nichols | July 6, 1954 |
| 2,716,646 | Willett et al. | Aug. 30, 1955 |
| 2,748,144 | Hanson et al. | May 29, 1956 |
| 2,787,634 | Coover et al. | Apr. 2, 1957 |
| 2,849,449 | Cope et al. | Aug. 26, 1958 |

OTHER REFERENCES

Linstead et al.: Journal of the Chemical Society, 1937, pages 911–21.

Beilstein: Vol. 18, page 331 (1934).

Dunbrook et al., abstract of application Serial No. 767,360, published March 13, 1951.

Rodd (Ed.): Chem. of Carbon Compounds, Elsevier Pub. Co., New York, Vol. IVA (1957), pages 219 and 220.